No. 873,147. PATENTED DEC. 10, 1907.
H. S. BALDWIN.
STEERING WHEEL PIVOT FOR AUTOMOBILES.
APPLICATION FILED MAR. 25, 1904.
2 SHEETS—SHEET 1.
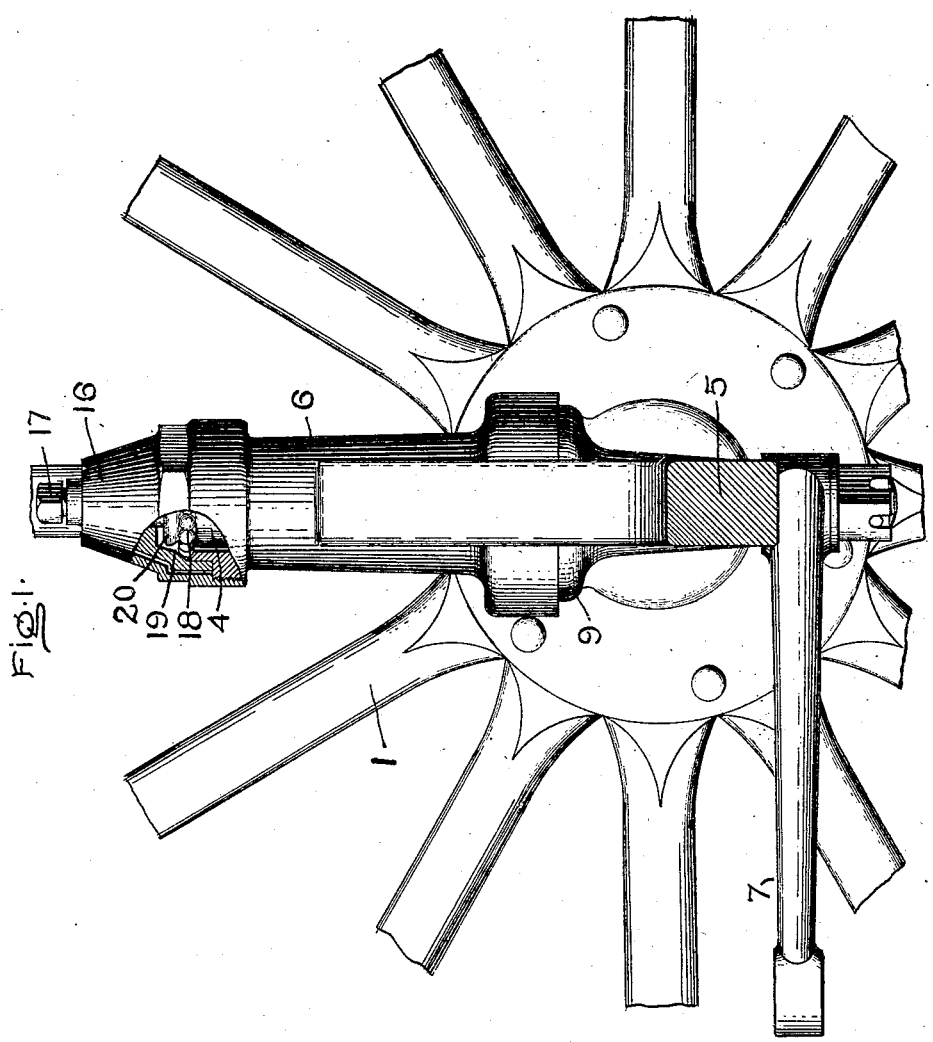
Witnesses
Inventor
Henry S. Baldwin
By
Atty.

No. 873,147.
PATENTED DEC. 10, 1907.
H. S. BALDWIN.
STEERING WHEEL PIVOT FOR AUTOMOBILES.
APPLICATION FILED MAR. 25, 1904.
2 SHEETS—SHEET 2.
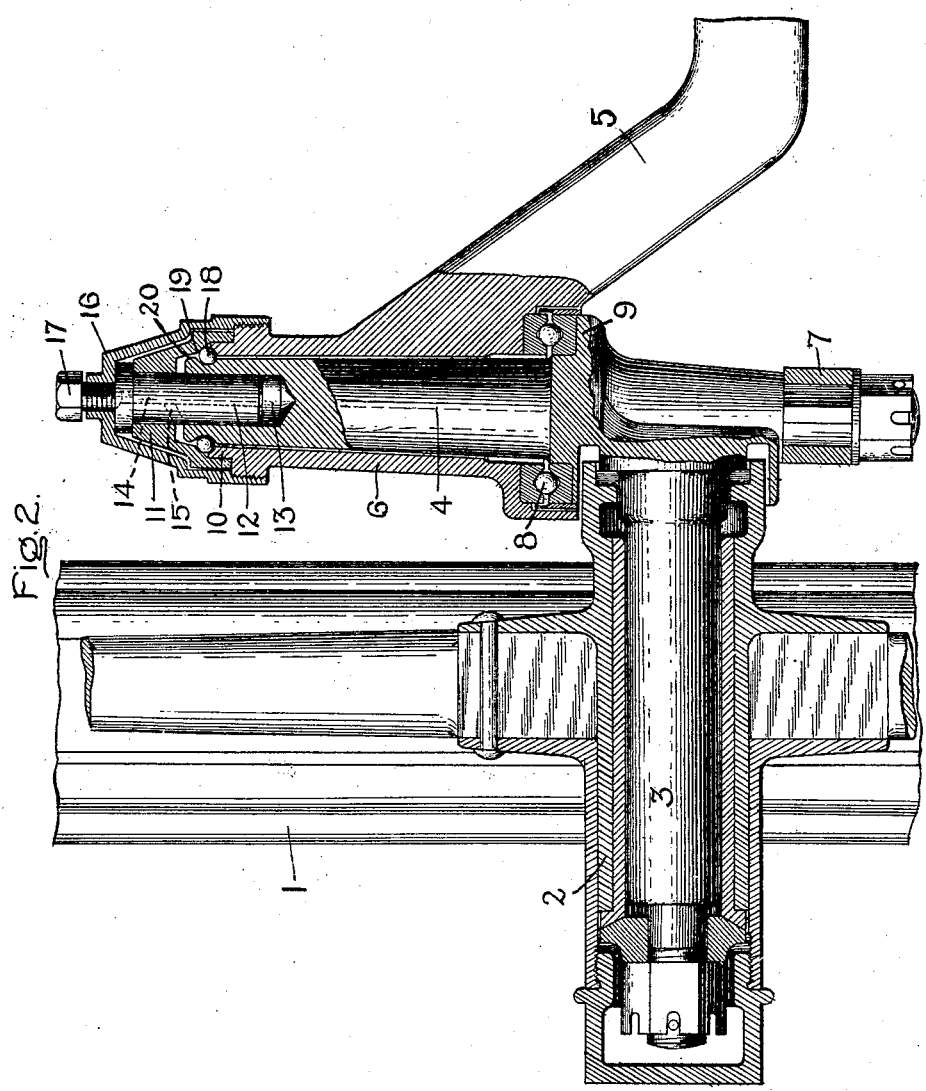
Witnesses
Inventor
Henry S. Baldwin
By
Att'y.

UNITED STATES PATENT OFFICE.

HENRY S. BALDWIN, OF LYNN, MASSACHUSETTS, ASSIGNOR TO GENERAL ELECTRIC COMPANY, A CORPORATION OF NEW YORK.

STEERING-WHEEL PIVOT FOR AUTOMOBILES.

No. 873,147.  Specification of Letters Patent.  Patented Dec. 10, 1907.

Application filed March 25, 1904. Serial No. 199,930.

*To all whom it may concern:*

Be it known that I, HENRY S. BALDWIN, a citizen of the United States, residing at Lynn, county of Essex, State of Massachusetts, have invented certain new and useful Improvements in Steering-Wheel Pivots for Automobiles, of which the following is a specification.

This invention relates to automobiles, and its object is to improve the pivots of the steering-wheels, especially those of the so-called Le Moine type. In this construction, the wheel-axle and the pivot are an L-shaped forging, the stem of the L forming an upright pivot which is journaled in a suitable bearing in the end of the stationary axle of the vehicle. The weight of the vehicle is supported by an annular horizontal ball bearing for which a shoulder is provided near the lower end of the pivot. The upper end of the pivot is steadied and centered by a stout steel pin secured to the top of the axle-bearing and extending downward into a socket in the upper end of the pivot. In order to prevent the wheel and its pivot from dropping out of the bearing when the axle is raised or when for any other reason a steering wheel is deprived of the support of the roadway, it has been proposed to use clamps or bolts passing through the axle. This construction seems objectionable to me and I have therefore devised the improved pivot-holding or retaining device which forms the subject of the present application. The upper end of the pivot is extended above the bearing and is provided with a circumferential groove in which is located a retainer engaging both with the pivot and the upper end of the bearing. Under normal conditions, this retainer is idle, but in case the wheel is accidentally held off the ground, the retainer locks the pivot from dropping out of the bearing.

In the accompanying drawings, Figure 1 is an end elevation of a steering-wheel pivot bearing, partly broken away to show my improved retaining device, and Fig. 2 is a longitudinal section of the wheel-axle, pivot and bearing.

The wheel 1 may be of any desired construction. Its hub 2 is mounted on a short axle 3 which is integral with the upright pivot 4. The stationary axle 5 has a long upright bearing 6 in which the pivot is journaled. An arm 7 rigidly secured to the depending lower end of the pivot enables the pivot to be oscillated to turn the wheel and steer the vehicle.

The main or step bearing which supports the weight of the vehicle is formed by a series of balls 8 received between an annular grooved shoulder 9 near the lower end of the pivot and a corresponding annular groove in the lower end of the bearing 6. At the upper end of said bearing is a shoulder 10, on which is snugly fitted a cap 11 having a central opening in line with the axis of the pivot. A strong steel centering-pin 12 is firmly held in said opening and depends into a socket 13 in the upper end of the pivot. The pin is cylindrical and fits the walls of said socket so as to serve as an upper or bolster bearing for the pivot. The socket is deeper than the pin, to form an oil reservoir, and an oil-feeding passage 14 runs down through the pin, a side passage 15 permitting the escape of oil to the upper end of the pivot and thence down to the step bearing. A hood 16 is secured on the bearing 6 concentric with the cap 11, and is provided with a screw-plug 17 for closing the upper end of the oil-passage 14.

The upper end of the pivot projects above the bearing 6, and is provided with a circumferential groove. Preferably coöperating with this is a countersink in the upper end of the bearing, the two forming an annular seat or race for a retainer or pivot-locking device. This is preferably a series of steel balls 18, which are held in the race by the internal surface 19 of the annulus or cap 11. As this surface prevents the balls from moving radially away from the pivot, it is evident that they will catch the overhanging lip 20 on the pivot and prevent the pivot from dropping out of the bearing in case the wheel is left unsupported. Under normal conditions, however, the balls rest idly in their race.

In case it is desired to take out the pivot, the hood is unscrewed, the cap lifted off, and the balls removed from the race; which leaves the pivot free to slip down out of the bearing.

While I have described my pivot-lock as a series of balls, yet it is evident that this idea is capable of many variations; the essential thing being one or more removable locking pieces engaging both with the pivot and with the bearing, and affording no obstruction to the flow of oil to the step-bearing. Without suggesting, therefore, any of the several modifications of my invention, I wish it to be understood that while, in accordance with the patent statutes, I have described and illustrated the best mode of carrying out my idea, yet I do not regard the scope of my invention as limited thereto.

What I claim as new and desire to secure by Letters Patent of the United States, is:

1. The combination with a steering-wheel pivot, of an upright bearing therefor, a freely rotatable retaining device arranged between said pivot and said bearing for preventing relative axial movement between the latter and the bearing, and a cap supported by the bearing which maintains the retaining device in operative position to the pivot.

2. The combination with a steering-wheel pivot, of an upright bearing therefor provided with a centering pin entering the upper end of said pivot, a loose retainer located below the upper end of the pivot for preventing it from dropping out of said bearing, and a removable member on said bearing for holding said retainer in place.

3. The combination with a steering-wheel pivot, having a groove in its cylindrical surface, of an upright bearing for said pivot, a freely rotatable retainer supported by said bearing and engaging with said groove, and a removable member engaging the periphery of said bearing for holding said retainer in place.

4. The combination with a steering-wheel pivot, having a circumferential groove in its cylindrical surface, of an upright bearing for said pivot, one or more loose retainers engaging the groove, said retainers being supported by the bearing and rotatable about an axis other than the axis of the pivot, and a removable member on said bearing for holding said retainer in place.

5. The combination with a steering-wheel pivot having a circumferential groove, of an upright bearing for said pivot having a corresponding groove, a plurality of balls interlocking in the grooves to prevent axial movement between the pivot and the bearing, and a removable cap on said bearing for retaining the balls in the grooves.

6. The combination with a steering-wheel pivot, having a circumferential groove, of an upright bearing for said pivot whose upper end is adjacent to said groove, one or more loose retainers resting on the end of said bearing and engaging with said groove, and means for holding said retainers in operative position.

7. The combination with a steering-wheel pivot, having a circumferential groove, of an upright bearing for said pivot, whose upper end is adjacent to said groove, a series of balls resting on the end of said bearing and engaging with said groove, and removable means on said bearing for preventing any radial movement of said balls.

8. The combination with a steering-wheel pivot, having a circumferential groove, of an upright bearing for said pivot whose upper end is adjacent to said groove, a series of balls resting on the end of said bearing and engaging with said groove, and a removable annular member on said bearing having its inner surface close to said balls.

9. The combination with a steering-wheel pivot, having a central socket and a circumferential groove, of an upright bearing for said pivot, a series of balls resting on said bearing and engaging with said groove, a centering-pin fitting said socket, and a cap on the upper end of said bearing supporting said pin and keeping said balls in engagement with said groove.

10. The combination of a steering-wheel pivot, a bearing therefor, an integral overhanging portion on the pivot, retaining balls supported by the bearing which are adapted to engage with the under surface of said overhanging portion for holding the pivot in the bearing, and a removable annular member on said bearing for holding said retaining means against movement away from said pivot.

11. The combination with a steering-wheel pivot, a bearing therefor, an integral over-hanging portion on the pivot, a retaining device supported by the bearing and engaging beneath said over-hanging portion, a cap for holding said retaining device in place, a hood secured to said bearing member and surrounding said cap, and means on said hood for holding said cap in operative position.

12. The combination with a steering-wheel pivot, a bearing therefor, an integral over-hanging portion on the pivot, a retaining device supported by the bearing and engaging under said over hanging portion, a cap arranged to hold said retaining devices against movement away from the pivot, a centering pin extending through said cap and into said pivot, and a hood secured to said bearing and surrounding said cap and centering pin to hold them in position.

In witness whereof I have hereunto set my hand this 22nd day of March, 1904.

HENRY S. BALDWIN.

Witnesses:
   DUGALD McK. McKILLOP,
   JOHN A. McMANUS.